United States Patent [19]

Cros

[11] Patent Number: 4,927,597
[45] Date of Patent: May 22, 1990

[54] DEVICE FOR COOLING THE MAIN VESSEL OF A FAST NEUTRON NUCLEAR REACTOR COOLED BY A LIQUID METAL

[75] Inventor: Alain Cros, Lyons, France

[73] Assignee: NOVATOME, Courbevoie, France

[21] Appl. No.: 313,341

[22] Filed: Feb. 21, 1989

Related U.S. Application Data

[63] Continuation of Ser. No. 106,294, Oct. 9, 1987, abandoned.

[30] Foreign Application Priority Data

Oct. 9, 1986 [FR] France .................. 86 14052

[51] Int. Cl.⁵ .................. G21C 11/00; G21C 15/00
[52] U.S. Cl. .................................................. 376/290
[58] Field of Search ............... 376/290, 352, 403, 404, 376/405

[56] References Cited

U.S. PATENT DOCUMENTS

| | | |
|---|---|---|
| 3,962,032 | 6/1976 | Berniolles et al. ............ 376/290 |
| 4,167,445 | 9/1979 | Aubert et al. . |
| 4,249,995 | 2/1981 | Jogand .......................... 376/290 |
| 4,298,431 | 11/1981 | Depierre et al. ................ 376/290 |
| 4,477,410 | 10/1984 | Debru ............................ 376/290 |
| 4,664,876 | 5/1987 | Uotani et al. .................. 376/290 |

FOREIGN PATENT DOCUMENTS

| | | |
|---|---|---|
| 0064921 | 11/1982 | European Pat. Off. . |
| 0065912 | 12/1982 | European Pat. Off. ............ 376/290 |
| 2347749 | 11/1977 | France . |
| 2370344 | 7/1978 | France ............................ 376/290 |
| 2425129 | 11/1979 | France . |
| 0087394 | 5/1984 | Japan ............................. 376/290 |
| 0168389 | 9/1984 | Japan ............................. 376/290 |
| 1209388 | 9/1986 | Japan ............................. 376/290 |
| 2020084 | 11/1979 | United Kingdom ............. 376/290 |

*Primary Examiner*—Harvey E. Behrend
*Attorney, Agent, or Firm*—Pollock, Vande Sande & Priddy

[57] ABSTRACT

The upper part of the vessel (3) is cooled as a result of the circulation of cooled sodium (27). The cooled sodium coming form the lower part of the reactor core is introduced into a first collector (15) via pipes (17) and then overflows into a second collector (16). The second collector (16) or return collector is delimited by an overflow sleeve (18) and by an inner sleeve (21), the height of which is substantially less than the height of the overflow sleeve (18). The lower part of the inner sleeve (21) is connected to the overflow sleeve (18) by an annular plate (22) ensuring the stiffening of the sleeve (18). The height of the sleeve (21) is preferably between one-third and third of the height of the sleeve (18). This prevents vibrations from being generated during the circulation of the sodium.

5 Claims, 2 Drawing Sheets

DEVICE FOR COOLING THE MAIN VESSEL OF A FAST NEUTRON NUCLEAR REACTOR COOLED BY A LIQUID METAL

This application is a continuation of application Ser. No. 106,294, filed Oct. 9, 1987, now abandoned.

FIELD OF THE INVENTION

The invention relate to a device for cooling the main vessel of a fast-neutron nuclear reactor cooled by a liquid metal, such as sodium.

BACKGROUND OF THE INVENTION

In fast-neutron nuclear reactors cooled by a liquid metal, the large-size main vessel contains liquid metal, in which the reactor core is immersed. This vessel generally comprises a cylindrical side wall and a dished bottom, and is suspended on the structure of the reactor by means of the upper end of its cylindrical wall.

The level of liquid metal in the main vessel is such that the upper part of the cylindrical wall is in contact with the sodium up to a certain height, and as a result of conduction the submerged part is therefore at the same temperature as the sodium in contact with it. The upper part of the main vessel in contact with gas has a temperature which decreases virtually linearly up to its fixing point.

In order to perform its function of supporting the core and as an intermediate safety containment, the vessel must be kept cold during its normal operation (the version with negligible creep). Moreover, the system must be such that the free level of sodium in contact with the vessel is fixed, in order to avoid problems of progressive deformation linked to the variations in level.

Consequently, this upper part of the main vessel located in line with the hot collector must be kept cold and with a fixed level of sodium.

Of the many solutions, the most common involves circulating cooled sodium in contact with the inner surface of the wall of the vessel in its upper part. This cooled or cold sodium is taken up at the outlet of the primary pumps and comes from the cold collector of the reactor, into which opens the outlet of the intermediate exchangers. Suitable means ensure that this cold sodium is injected into a first collector or overflow collector of annular shape, formed between the upper part of the wall of the main vessel of substantially cylindrical shape, and a sleeve, called an overflow sleeve, coaxial relative to the wall of the main vessel and of a diameter less than the diameter of this vessel. The height of the sleeve and that of the overflow collector correspond to a fraction of the height of the vessel.

The cold sodium received in the overflow collector flows into a second annular collector, called a return collector, over the top of the upper end of the overflow sleeve. The return collector is delimited by the overflow sleeve forming its outer wall and by an inner sleeve of substantially cylindrical shape, coaxial relative to the overflow sleeve and to the wall of the vessel and of a diameter less than that of the overflow sleeve. Holes made in the bottom of the return collector allow the liquid sodium to return into the cold collector of the main vessel. These holes are provided as a function of the inflow rate of the cold sodium into the return collector, so that the sodium level in this collector is set at a certain height below the sodium overflow level corresponding to the upper end of the overflow sleeve.

The overflow collector is usually supplied with cold sodium via pipes putting it into communication with the flooring supporting the bearer receiving the feet of the assemblies of the core, into which the cold sodium is injected by means of the pumps.

In prior art devices, the overflow sleeve and the inner sleeve are connected to the same bottom, with the result that the two collectors have a substantially equivalent height. On the other hand, the effective head of the sodium corresponding to the difference in level in the two collectors is such that the overflow of sodium gives rise to phenomena of vibration of the vessel and of the sleeves delimiting the collectors.

In fact, the main vessels of fast-neutron nuclear reactors built or being designed at the present time have a large diameter of the order of twenty meters and a relatively small thickness of the order of twenty-five millimeters, making it possible to limit the thermal stresses and the weight of metal used for constructing the vessel. The collector sleeves themselves have dimensions near those of the vessel, and these units are extremely flexible and have natural periods of vibration which are very low and close to one another. Vibrations are therefore generated easily when the sodium overflows.

SUMMARY OF THE INVENTION

The object of the invention is, therefore, to provide a device for cooling the main vessel of a fast-neutron nuclear reactor cooled by a liquid metal, such as sodium, the main vessel of the reactor containing liquid metal having a substantially cylindrical shape in its upper part and being arranged with its axis vertical, and the cooling device consisting of a first annular collector between the upper part of the wall of the main vessel and an overflow sleeve coaxial with to the main vessel and of a diameter less than that of the vessel, of a second annular collector between the overflow sleeve and an inner sleeve coaxial relative to the main vessel and to the overflow sleeve and of a diameter less than that of the overflow sleeve, and of a means for conveying cooled liquid metal into the first collector, so as to put in contact with the inner wall of the main vessel this cooled liquid metal which subsequently flows into the second collector over the top of the upper end of the overflow sleeve, in order thereafter to return into the main vessel via orifices made in the bottom of the second collector, this cooling device making it possible to limit the vibrations to a minimum during the circulation of the cooled sodium.

To this end, the inner sleeve of the second collector has a height substantially less than the height of the overflow sleeve, the upper ends of these sleeves being substantially at the same level, and the lower part of the inner sleeve of the second collector being connected to the overflow sleeve in a region distant from the ends of this overflow sleeve.

BRIEF DESCRIPTION OF THE DRAWINGS

In order that the invention may be more clearly understood, an embodiment of a cooling device according to the invention, used in a fast-neutron nuclear reactor of the integral type cooled by liquid sodium, will now be described by way of example, with reference to the accompanying drawings.

DESCRIPTION OF PREFERRED EMBODIMENT

Figure 1:
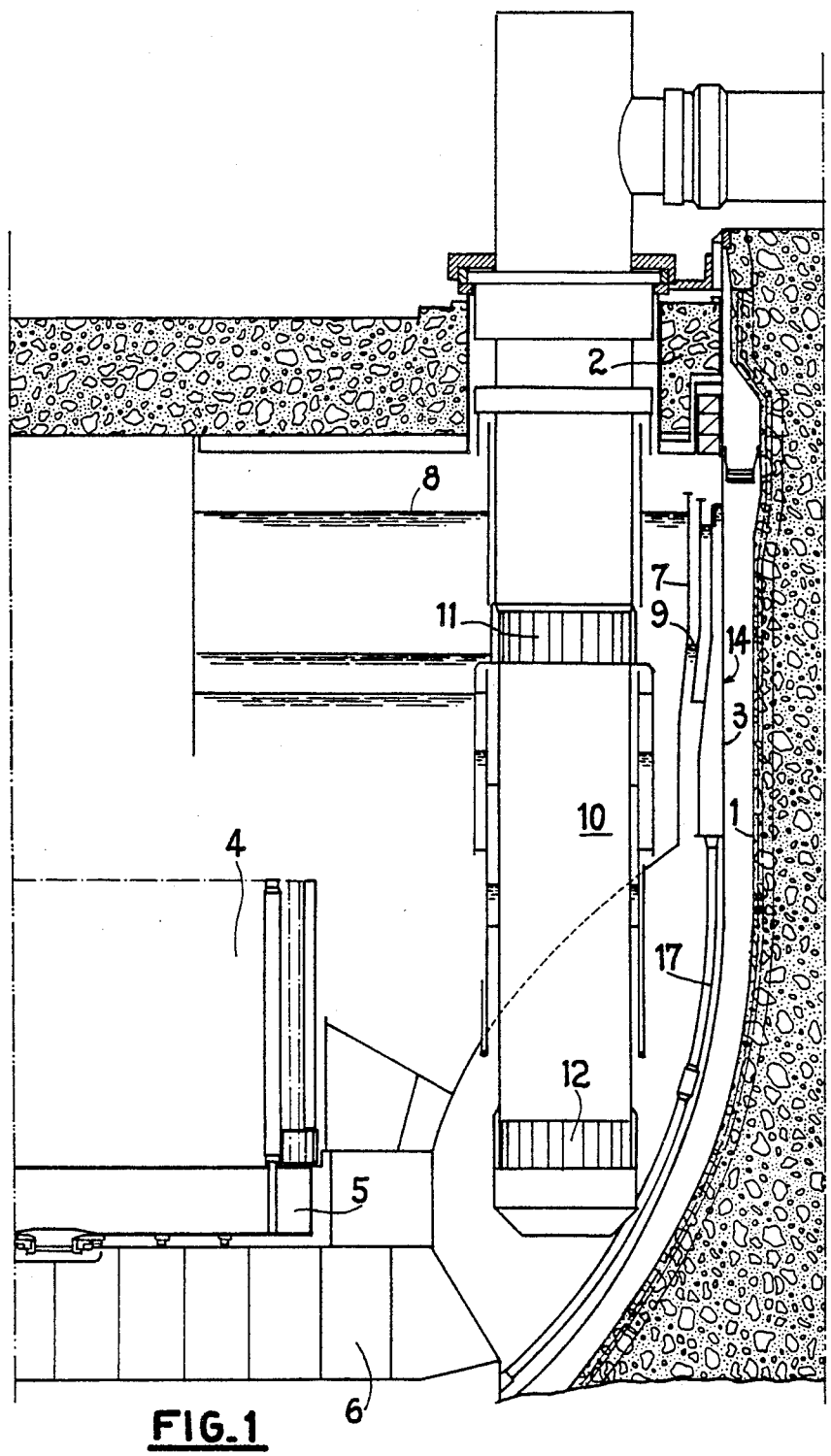
FIG. 1 is a sectional view in a vertical plane of part of a fast-neutron nuclear reactor incorporating a cooling device according to the invention.

FIG. 1 shows part of the vessel shaft 1 of a fastneutron nuclear reactor, to the upper part of which is fastened the slab 2 closing the main vessel 3 of the reactor. The vessel 3 comprises a cylindrical side wall closed by means of a dished bottom. The vessel 3 is suspended in the vessel shaft 1 by means of the upper part of the side wall. The main vessel 3 contains cooling liquid sodium, in which is immersed the reactor core 4 consisting of fuel assemblies, the feet of which are fastened in a bearer 5 resting on a flooring 6, itself supported by the bottom of the vessel 3.

The main vessel contains an inner vessel 7 delimiting, within the main vessel, a hot collector which is filled with sodium up to the level 8 and in which is immersed the core 4 of the reactor, and a cold collector containing liquid sodium to the upper level 9. An intermediate exchanger 10 enters the vessel through an orifice in the slab 2 and passes through the inner vessel 7, in such a way that its upper part having inflow orifices 11 is in the hot collector and its lower part having outlet orifices 12 is in the cold collector.

Pumps (not shown) make it possible to extract the cooled sodium coming from the outlets 12 of the intermediate exchangers, such as 10, from the cold collector and reinject it into the bearer 5 at the base of the core. The cooled sodium in the intermediate exchangers is thus returned to the base of the core 4, in which it heats up by circulating from the bottom upwards.

Figure 2:
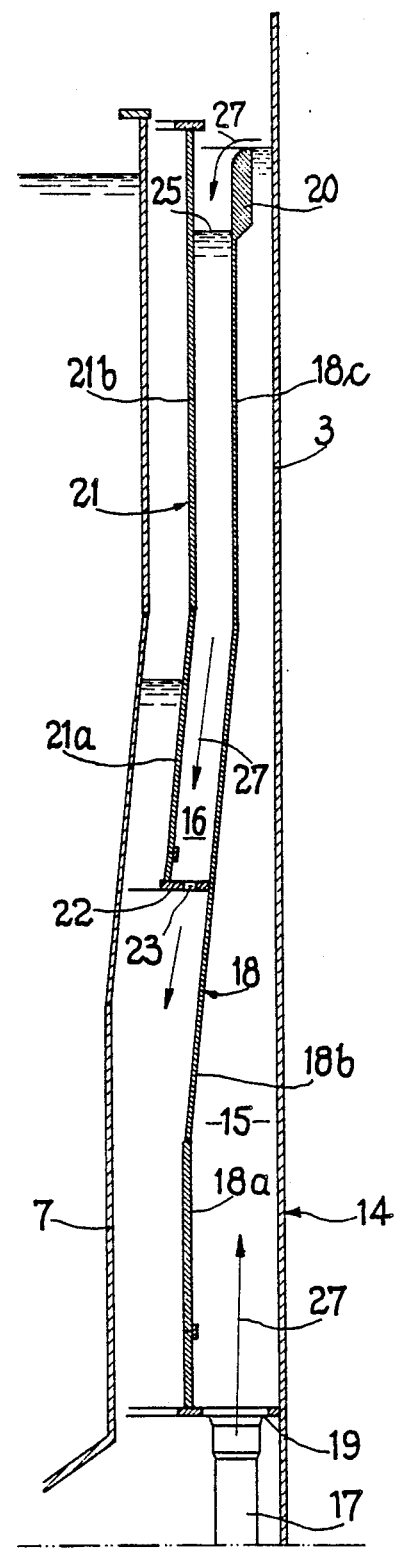
FIG. 2 is an enlarged view of a part of FIG. 1 corresponding to the cooling device.

The device for cooling the upper part of the vessel 3, designated as a whole by the reference 14 and which can be seen in FIGS. 1 and 2, comprises a first collector 15, a second collector 16 and a set of cooled-sodium feed pipes 17 joining the lower part of the flooring 6 to the lower part of the first collector 15.

The first collector 15 or overflow collector has an annular shape and is delimited by the upper part of the wall of the main vessel 3 and by an overflow sleeve 18 connected, in its lower part, to the wall of the main vessel 3 by means of an annular plate 19. The overflow sleeve 18 has a cylindrical lower part 18a connected to the annular plate 19 at its lower end, an intermediate frusto-conical part 18b widened in the upward direction, and a cylindrical upper part 18c ending in an overflow sill 20 consisting of an annular bolster of rounded cross-section, which can be seen in FIG. 2. The overflow sill 20 is continuous over the entire periphery of the sleeve 18c and, as seen in midsection, has a shape making it possible to ensure good adhesion of the stream of sodium in its flow over the sill 20 and prevents the blanket gas present above the upper level of the sodium from being carried along with it. The successive sleeves 18a, 18b and 18c forming the overflow sleeve 18 are all coaxial with to the vessel 3 and have a diameter less than the diameter of this vessel.

The annular plate 19 forming the bottom of the overflow collector 15 has orifices, into which penetrate the ends of the feed pipes 17.

Cooled sodium coming from the bearer 5, into which it is injected by means of the reactor pumps, therefore enters the overflow collector 15 which is filled to its upper level corresponding to the overflow sill 20.

The second collector 16 or return collector is delimited by the upper part of the overflow sleeve 18 and by an inner sleeve 21 connected, in its lower part, to the overflow sleeve by means of an annular plate 22 welded to the overflow sleeve and to the end of the inner sleeve 21. The inner sleeve 21 comprises a lower part 21a of frustoconical shape and an upper part 21b of cylindrical shape. The upper end of the part 21b is at a level slightly higher than the level of the sill 20 and has a horizontal annular rim.

The successive sleeves 21a and 21b forming the inner sleeve 21 are coaxial with to the overflow sleeve 18 and to the wall of the main vessel 3. These sleeves 21a and 21b have diameters less than the diameter of the corresponding parts of the overflow sleeve 18. The inner sleeve 21 and the overflow sleeve 18 are at a virtually constant distance from one another over the entire height of the return collector 16. The bottom 22 of this collector has orifices 23 allowing the liquid sodium to return at a controlled flow rate into the cold collector provided inside the main vessel by means of the inner vessel 7. The orifices 23 are such that the level of the cooled sodium which overflows into the return collector 16 is set at a position 25 located below the upper overflow part of the sill 20.

In order to prevent the risks of vibration of the sleeves and vessel, the height separating the upper overflow part of the sill 20 from the level 25 of sodium in the collector 16 is maintained at a value in the neighborhood of 0.32 meters.

Furthermore, according to the invention, the height of the inner sleeve 21 of the return collector 16 is substantially less than the height of the overflow sleeve 18. Since the upper part of this inner sleeve 21 is at a level near the level of the sill 20, the lower part of the sleeve 21 is connected to the sleeve 18 by means of the plate 22, forming the bottom of the return collector 16, in a region of the sleeve 18 distant from its ends.

The inner sleeve or return sleeve 21 chosen will preferably have a height in the neighbourhood of one half the height of the sleeve 18.

In more general terms, while remaining within the scope of the invention, it will be possible to use a return sleeve 21 of a height of between one-third and two-thirds of the height of the overflow sleeve 18.

Thus, the inner sleeve or return sleeve 21 has a vibration frequency differing greatly from that of the overflow sleeve 18. Moreover, the annular plate 22 forming the bottom of the return collector 16 ensures the stiffening of the overflow sleeve 18, to which it is fastened, in a region which is near its middle part or at least distant from its ends.

The overflow sleeve, which is of greater rigidity, is more resistant to buckling. The same is true of the inner sleeve 21, the smaller height of which goes hand in hand with greater rigidity.

Since the two sleeves delimiting the collector 16 have natural periods differing greatly from one another and much greater rigidity than the devices known from the prior art, there is no risk of the two collectors being coupled in terms of vibration, and the vibrations no longer tend to start during the circulation of the cooling sodium indicated by the arrows 27. The shape of the overflow sill 20 makes it possible to ensure good adhesion of the stream of sodium and prevents gas from being carried along by the sodium. The overflow along the entire periphery of the sleeve 18 also ensures, without any difficulty, that a large quantity of sodium can flow through.

A further advantage of the arrangement according to the invention is that the quantity of sheet metal used for constructing the cooling device is reduced, since the inner return sleeve 21 is of smaller height.

The shape of the overflow and return sleeves can differ from that described, the lower part of the return sleeve can be fastened to the overflow sleeve in a way other than by means of an annular plate, and the upper part of the return sleeve can be located exactly in line with the upper part of the overflow sleeve.

Finally, the cooling device according to the invention can be used in any fast-neutron nuclear reactor cooled by a liquid metal.

What is claimed is:

1. In a fast neutron nuclear reactor having a main vessel (3) containing liquid metal coolant therein, said main vessel having a substantially cylindrical wall in its upper part and a dished bottom in its lower part and being arranged with its axis vertical and an inner vessel located inside the main vessel, having a diameter less than that of the main vessel and containing hot liquid metal coolant, a reactor core positioned in said inner vessel, said rector core being supported by a means including a flooring, said flooring being supported by said dished bottom of said main vessel, the improvement consisting of a cooling device (14) for cooling the main vessel, said cooling device consisting of (a) a first annular collector between the upper part of the wall of the main vessel (3) and an overflow sleeve (18) coaxial with the main vessel (3) and of a diameter less than that of the main vessel but greater than that of the inner vessel;

(b) a second annular collector (16) between the overflow sleeve (18) and an inner sleeve (21) coaxial with the main vessel (3) and with the overflow sleeve (18) and of a diameter less than that of the overflow sleeve (18) but greater than that of the inner vessel; and (c) a conduit means (17) connected to a lower end of the first collector and to a lower part of the flooring for conveying cooled liquid metal into said first collector (15), and contacting and cooling an inner wall of said main vessel (3), up to an upper part of the overflow sleeve, said overflow sleeve having a top at its upper part for conveying said cooled liquid metal into said second collector, said second collector having a bottom pierced by orifices debouching into an annular space between the inner vessel and the overflow sleeve, said annular space being in communication at its lower end with a part inside the main vessel containing cooled liquid metal, said annular space containing cooled liquid metal up to a level above the bottom of said second collector and less than the level of hot liquid metal in the inner vessel, the orifices in said bottom of said second collector being such that the level of cooled liquid metal in said second collector is controlled and maintained above the level of cooled liquid metal in the annular space, said overflow sleeve and said inner sleeve each being a right circular cylinder having a substantially constant diameter throughout its length;

(d) wherein the inner sleeve (21) of said second collector (16) has a length substantially less than the length of the overflow sleeve (18), the upper ends of these sleeves (18, 21) being substantially at the same level, and the lower part of the inner sleeve (21) of said second collector (16) being connected to the overflow sleeve 18 in a region substantially equidistant from each end of said overflow sleeve (18) by said bottom of said second collector.

2. Cooling device according to claim 1, wherein the height of the inner sleeve (21) of the second collector (16) is between one-third and two-thirds of the height of the overflow sleeve (18).

3. Cooling device according to claim 2, wherein the height of the inner sleeve (21) of the second collector (16) is substantially one-half the height of the overflow sleeve (18).

4. Cooling device according to claim 1, wherein the lower part of the inner sleeve (21) of the second collector (16) is connected to the overflow sleeve by means of a plane annular plate (22) ensuring the stiffening of the overflow sleeve (18) in a region distant from its ends.

5. Cooling device according to claim 1, wherein the orifices (23) in the bottom (22) of the second collector (16) are such that the level (25) of cooled sodium is set in a position located substantially 0.32 meters below the upper part of the overflow sleeve (18) forming the overflow sill.

* * * * *